Patented Mar. 4, 1941

2,233,575

UNITED STATES PATENT OFFICE 2,233,575

MANUFACTURE OF CERAMIC WARES

George J. Bair, Pittsburgh, Pa., assignor to Norbert S. Garbisch, Butler, Pa.

No Drawing. Application December 16, 1938, Serial No. 246,172

3 Claims. (Cl. 106—11)

The present invention relates to the manufacture of clay products, and it has particular relation to the manufacture from clay of vitreous porcelain-like products characterized by relatively hard, dense, translucent structure.

One object of the invention is to provide a process of preparing products of the foregoing type in which the use of feldspar as a fluxing agent is reduced to a minimum or is entirely obviated.

This and other objects of the invention will be apparent from consideration of the following specification and the appended claims.

In the manufacture of ceramic wares such as porcelain or the like, it is customary to incorporate a plastic clay such as pottery clay with suitable proportions of a fluxing agent, such as feldspar and a relatively infusible material of low shrinkage characteristics, such as ground flint or silica, to provide a body which in moist state can be worked to provide coherent masses. These masses when dried and fired at a suitable temperature become fluxed into relatively strong, dense bodies which will withstand ordinary usage and which upon glazing are of relatively attractive appearance.

Feldspar which is customarily employed as the fluxing agent in the foregoing bodies is comparatively expensive and does not always produce the desired results. Attempts have been made to replace all or a part of this ingredient of the pottery bodies with finely crushed glass. The latter material consists essentially of silica admixed with such fluxing agents as alkali and alkaline earth compounds. Although the glass is found to possess satisfactory fluxing powers and can be comparatively easily sintered down to provide a strong, coherent and more or less translucent mass, in actual practice certain difficulties are encountered in connection therewith. For example, it has been found that the material when formed into a slip such as that employed in the casting of many wares, such as sanitary wares, tends to undergo fairly rapid hydrolysis, with resultant change in the pH value of the suspension. Apparently the changes in pH value of the slip result in changes in the casting characteristics of the material. For example, the materials when highly alkaline form a highly dispersed non-flocculent suspension. Variability in the pH value results in variations in the thickness and brittleness of the cast. If an attempt is made to adjust the pH value of the slip by addition of acid, or acid salts, great care must be exercised in order to obviate excessive lowering of the pH value, which tends to produce jellying of the body. Such adjustments with acids or acid salts are only temporary and are unsatisfactory where the storage of slip is necessary.

In processes where the material is worked as a plastic mass excessive alkalinity is objectionable because its weakens the green body and the material is difficult to work. On the other hand excessive acid is objectionable because it promotes shrinkage of the material during firing and introduces difficulties from warpage.

The present invention is based upon the discovery that, by subjecting glass in finely divided condition to preliminary treatment with acid or preferably by subjecting the glass initially to treatment with alkali and subsequently with acid, and then properly washing the material in order to remove salts and free acid, it is possible to obtain material which is substantially free from the foregoing difficulties. For example, treated glass is found to be essentially "case-hardened." That is, particles appear to comprise cores of essentially unchanged glass excellently adapted to act as fluxing agents in pottery bodies. At the same time the particles include outer layers from which the soluble alkalies have been largely removed, thus providing a residual silica coating of suitable forms. Accordingly, these particles, when compounded into clay slip or are incorported into a plastic clay body, result in pottery bodies of relatively low initial pH value. This pH value is also comparatively constant, thus admitting of formation of relatively large batches of material, which can be kept in storage for considerable periods of time and can be worked up as required by the manufacturer.

In the practice of the invention a glass, for example of the grade of ordinary plate glass, or window glass, and consisting essentially of silica, alkali and lime, is crushed to suitable particle size. Preferably the major portion of the material will pass through a screen of 200 mesh and may be crushed to finer state of subdivision, if so desired. The minimum of particle size is dictated largely by the cost of the grinding. The crushed glass is then treated for a considerable period, e. g. 10 or 12 hours, more or less, with an acid, e. g. a strong mineral acid such as sulphuric acid or hydrochloric acid. The former is preferred, but the latter may also be employed if so desired. Preferably acid of about $\frac{5}{10}$ to 1 normal concentration is employed. If the concentration substantially exceeds the foregoing range, it is found that alkali is superficially extracted from the surface of the particles and that penetration then ceases or is reduced to such extent that the action of the acid is less effective than if lower concentrations are employed. The volume of solution employed may vary over considerable range. However, satisfactory results have been obtained by employment of 50 parts by weight of solution to 50 parts by weight of crushed glass.

Further improvements in the glass may be effected if prior to treatment with acid it is subjected to the action of an alkali such as sodium carbonate or sodium hydroxide. For example, 50 parts of crushed glass were admixed with 50 parts by weight of 1 normal sodium hydroxide and permitted to stand for a period of about 2 hours. The treated material was then filtered and was washed and was allowed to stand in 1 normal sulphuric acid for a period of 10 or 12 hours. Subsequently it was washed and dried.

The steps involved in the processes may be represented diagrammatically as follows:

PROCESS OF TREATING GLASS

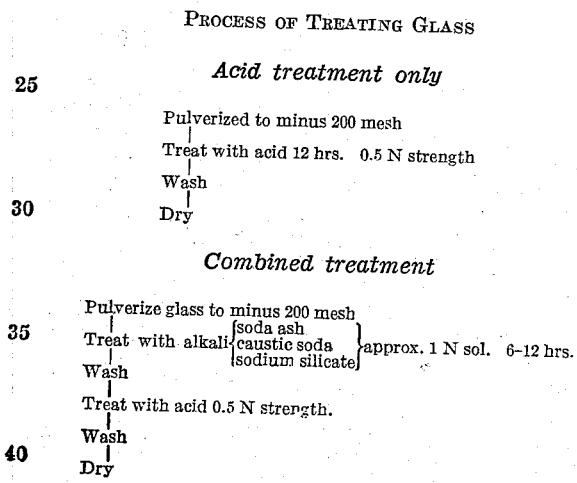

Since glass contains a considerable amount of hydrolizable alkali, simple treatment in finely divided state with water has an effect similar to that of treatment with alkali. For example, finely divided glass may be allowed to stand in water at room temperature for a considerable period, e. g. one week more or less. At the end of that time it may be treated with acid in accordance with the foregoing disclosure. If the temperature of hydrolization be increased, e. g. to boiling, the time of treatment may be substantially reduced. If desired, heat treatment may be effected in an autoclave under superatmospheric pressures and at temperatures above that of boiling water.

The material after treatment exhibits an excellent pH value which it maintains over long periods surprisingly well and it is excellently adapted for incorporation into pottery bodies. The following represents a suitable range of proportions for use in preparing a pottery body:

|  | Per cent |
|---|---|
| Pottery clay | 50 |
| Processed glass | 4-12 |
| Ground flint | 38-46 |

A specific example of a body within this range is as follows:

|  | Per cent |
|---|---|
| Pottery clay | 50 |
| Processed glass | 7.5 |
| Potters flint | 42.5 |

Of course other materials such as coloring matter may be added to the foregoing pottery body. A part of the glass may, also, be replaced by feldspar or other flux.

The mix may be pressed or otherwise formed, while it is in plastic state or in a "dry-press" consistency. It may likewise be formed into a slip which is cast in porous molds, or which may be applied as a glaze to other bodies. The bodies may be fired and annealed in the same manner as bodies containing feldspar as a flux. They are relatively free of shrinkage and warpage and are hard and vitreous.

Certain preferred embodiments of the invention have been described. These, however, are merely illustrative. Manifestly numerous modifications may be made therein without departure from the spirit of the invention or the scope of the appended claims.

What I claim is:

1. A process of forming pottery bodies, which process comprises incorporating with pottery clay and crushed flint, a flux consisting of glass crushed to pass a screen of 200 mesh, which glass, after crushing and prior to incorporation into the pottery body, has been conditioned to remove surface alkali from the particles thereof by subjecting it to the action of a strong mineral acid and then washing out the acid.

2. A process of forming a pottery body which comprises incorporating with clay in a pottery body crushed flint and as a flux for the body, glass crushed to pass a screen of about 200 mesh, said glass, after being crushed and before incorporation into the pottery body, having had the surface thereof conditioned to provide coatings relatively rich in silica by treating it first with alkali, then with strong acid, which acid subsequently is removed by washing.

3. A process of forming pottery bodies, which process comprises incorporating with pottery clay and crushed flint, a flux consisting of glass crushed to pass a screen of about 200 mesh, which glass after crushing and prior to incorporation into the pottery body has been conditioned to remove surface alkali from the particles thereof by subjecting it to the action of a strong mineral acid of about $\tfrac{5}{10}$ to 1 normal concentration, then washing out the acid.

GEORGE J. BAIR.